United States Patent
Duval et al.

(10) Patent No.: US 10,244,371 B2
(45) Date of Patent: Mar. 26, 2019

(54) MTC EVENT DETECTION AND SIGNALING

(71) Applicant: FUJITSU CONNECTED TECHNOLOGIES LIMITED, Kawasaki-shi, Kanagawa (JP)

(72) Inventors: Olivier Duval, Santa Clara, CA (US); Akira Ito, San Jose, CA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 96 days.

(21) Appl. No.: 15/313,949

(22) PCT Filed: May 23, 2014

(86) PCT No.: PCT/US2014/039435
§ 371 (c)(1),
(2) Date: Nov. 23, 2016

(87) PCT Pub. No.: WO2015/178937
PCT Pub. Date: Nov. 26, 2015

(65) Prior Publication Data
US 2017/0164137 A1    Jun. 8, 2017

(51) Int. Cl.
H04W 4/00       (2018.01)
*H04W 4/70*      (2018.01)
*H04W 74/08*     (2009.01)
*H04W 72/12*     (2009.01)

(52) U.S. Cl.
CPC ......... *H04W 4/70* (2018.02); *H04W 72/1215* (2013.01); *H04W 74/0833* (2013.01)

(58) Field of Classification Search
CPC ............... H04W 4/70; H04W 72/1215; H04W 74/0833; H04W 4/005
USPC ....................................................... 370/329
See application file for complete search history.

(56) References Cited

U.S. PATENT DOCUMENTS

| 2011/0199905 | A1  | 8/2011 | Pinheiro et al. |
| 2011/0270973 | A1  | 11/2011 | Liao |
| 2012/0163311 | A1  | 6/2012 | Park |
| 2012/0209978 | A1* | 8/2012 | Cho ...................... H04W 60/04 709/223 |

(Continued)

FOREIGN PATENT DOCUMENTS

| CN | 102754485 A | 10/2012 |
| EP | 1388237 A1  | 2/2004 |

(Continued)

OTHER PUBLICATIONS

Extended European Search Report for corresponding application No. 14892313.9, dated Sep. 18, 2017.

(Continued)

*Primary Examiner* — Mang Hang Yeung
(74) *Attorney, Agent, or Firm* — Maschoff Brennan

(57) ABSTRACT

A method for event detection. The method may include receiving an unscheduled message from an MTC device on a communication network during a specific event window, wherein the event message includes an MTC device identifier associated with the MTC device, determining whether the MTC device identifier is associated with the specific event window; and if the MTC device identifier is associated with the specific event window, outputting an event report.

17 Claims, 11 Drawing Sheets

(56) References Cited

U.S. PATENT DOCUMENTS

| | | |
|---|---|---|
| 2012/0264451 A1 | 10/2012 | Kim et al. |
| 2012/0281580 A1 | 11/2012 | Lee et al. |
| 2013/0039277 A1 | 2/2013 | Li et al. |
| 2013/0042011 A1 | 2/2013 | Sugizaki et al. |

FOREIGN PATENT DOCUMENTS

| | | |
|---|---|---|
| WO | 2010107354 A1 | 9/2010 |
| WO | 2011043588 A2 | 4/2011 |
| WO | 2011/100540 A1 | 8/2011 |
| WO | 2013138701 A2 | 9/2013 |

OTHER PUBLICATIONS

1st Office Action dated Oct. 12, 2018 issued in the corresponding Chinese application No. 201480079078.5 Full Translation of the Office Action.

\* cited by examiner

MTC EVENT DETECTION AND SIGNALING

FIELD

The embodiments discussed herein are related to MTC event detection and signaling.

BACKGROUND

Machine-type communications (MTC) is used by many different devices to communicate with each other. These devices may include sensors, switches, actuators, mobile devices, etc. In some applications MTC devices may communicate on a fixed reporting schedule. Often the schedule may have dozens of minutes between every report. Triggered reports may also be made when a device reports an unscheduled event such as, for example, an earthquake, high concentration of a substances, such as natural gas, among other events. These unscheduled events may be potentially dangerous situations and may require low-latency unscheduled communication to a remote station. When many MTC devices try to access a contention-based channel, such as a long term evolution (LTE) random access channel (RACH), at the same time, an overload may occur that may cause long delays for all MTC devices that are transmitting and delays for other devices.

The subject matter claimed herein is not limited to embodiments that solve any disadvantages or that operate only in environments such as those described above. Rather, this background is only provided to illustrate one example technology area where some embodiments described herein may be practiced.

SUMMARY

A method for event detection. The method may include receiving an event message from an MTC device via a resource on a communication network during a specific event time window, wherein the event message includes an MTC device identifier associated with the MTC device, determining whether the MTC device identifier is associated with the specific event time window; and in the event the MTC device identifier is associated with the specific event time window, outputting an event report.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings.

DESCRIPTION OF EMBODIMENTS

Machine-type communication (MTC) is a form of data communication that involves one or more devices that do not necessarily need human interaction. A communication service for machine-type communications may differ from a service optimized for human-to-human or human-to-device communications. For instance, machine-type communications often involve: different market scenarios, data communications without voice communication, lower costs and effort, a potentially very large number of communicating terminals and/or, little traffic per terminal among, other things.

An MTC device may be a device equipped for machine-type communication that communicates through a mobile network, such as a public land mobile network (PLMN) with MTC server(s) and/or other MTC device(s). In some configurations, an MTC device might also communicate locally (wirelessly, for example through a public area network (PAN), local area network (LAN), or hardwired) with other entities that may provide the MTC device with "raw data" for processing and/or communicating to the MTC server(s) and/or other MTC device(s). Local communication between MTC device(s) and other entities may occur in any number of ways using any number of techniques and/or protocols.

An MTC device, for example, may include security surveillance systems such as, a backup for a landline, physical access devices (e.g., keypads, fob readers), and/or vehicle security systems. An MTC device, for example, may also include tracking and tracing fleet management devices such as, for example, an order management device, a pay-as-you-drive device, an asset tracking device, a navigation device, a traffic information device, a road tolling device, and/or a road traffic optimization and/or steering device.

An MTC device, for example, may also include a payment device such as a point of sales device, a vending machine, and/or a gaming machine. An MTC device, for example, may also include a health monitoring device such as, for example, a vital signs monitoring device, a device supporting the aged or handicapped, web access telemedicine points, and/or a remote diagnostics device. An MTC device, for example, may also include remote maintenance and/or control sensors such as a light fixture, a pump, a valve, an elevator control device, a vending machine control, and/or a vehicle diagnostics device. An MTC device, for example, may also include a meter such as, a power meter, a gas meter, water meter, a heating meter, a grid control meter, and/or any industrial meter. Such a meter may monitor any type of physical or electronic data. An MTC device, for example, may also include consumer devices such as, for example, a digital photo frame, a digital camera, and/or an e-book.

Figure 1:
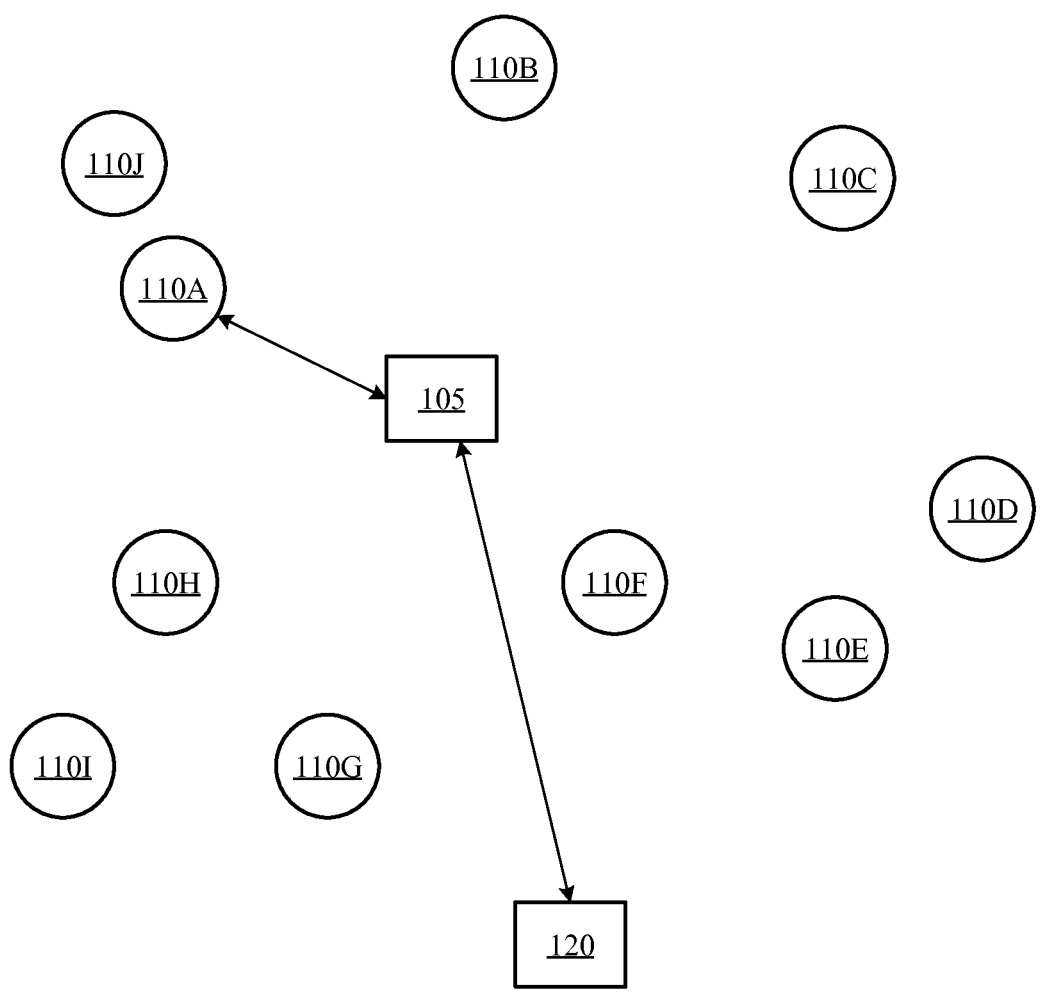
FIG. 1 illustrates an example mobile network with multiple MTC devices according to some embodiments described herein.

FIG. 1 illustrates an example mobile network with a multiple MTC devices 110A-110J, according to some embodiments described herein. The MTC devices 110A-110J communicate with a node 105 via a wireless network. The wireless network may include a long term evolution (LTE) network, a $3^{rd}$ generation (3G) network, an evolved multimedia broadcast multicast services (eMBMS) network, an evolved universal terrestrial radio access (E-UTRA) network, flat internet protocol (IP) network, LTE advanced network, time division (TD)-LTE network, an ultra-mobile broadband (UMB) network, a worldwide interoperability for microwave access (WiMax) network, a high speed packet access (HSPA)+ network, etc. Any type of wireless network may be used.

In some embodiments, the wireless network may be an LTE network. LTE networks may use Orthogonal Frequency-Division Multiple Access (OFDMA), which is a multi-carrier scheme that allocates radio resources to multiple users using Orthogonal Frequency Division Multiplexing (OFDM). For LTE, OFDMA splits the carrier frequency bandwidth into many small subcarriers spaced at 15 kHz, and then modulates each individual subcarrier using a modulation format, such as phase-shift keying (QPSK) digital modulation formats or quadrature amplitude modulation (QAM) formats, including 16, 32, or 64 bit QAM. OFDMA assigns each device the bandwidth needed for its transmission. Subcarriers frequencies that are not assigned to a device are unused, thereby reducing power consumption of the mobile network and internetwork interference.

The node 105 may be any device that facilitates wireless communication between MTC devices and a network or an MTC server 120. The node 105 may be an access point, such as an evolved node B (EnodeB), node B, base transceiver station, or any other wireless or wired access point. In some embodiments, the node 105 may host the Physical (PHY), Medium Access Control (MAC), Radio Link Control (RLC), and/or Packet Data Convergence Protocol (PDCP) layers. In some embodiments, the node 105 may control user-plane header-compression and/or encryption. In some embodiments, the node 105 may provide Radio Resource Control (RRC) functionality. In some embodiments, the node 105 may provide radio resource management, admission control, scheduling, enforcement of negotiated uplink quality of service (QoS), cell information broadcast, ciphering/deciphering of user and control lane data, and compression and decompression of downlink and uplink user-plane packet headers.

The MTC server 120 is a server that may communicate to the mobile network and to MTC devices through the mobile network and/or through the node 105. The MTC server may also have an interface, which may be accessed by the MTC devices or the users of the MTC devices. The MTC server may perform services for the MTC devices or the users of the MTC devices. These services may include any number of services described herein as well as additional services. The MTC server 120 may include one more servers such as, for example, a packet data network (PDN) gateway, a servicing gateway, and/or mobility management entity. In some embodiments, the MTC server 120 may be included with the node 105.

Figure 4:
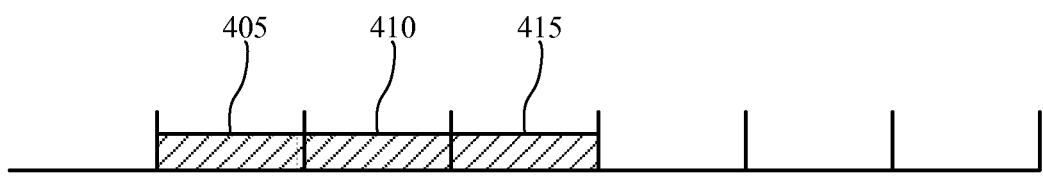
FIG. 4 illustrates a timing diagram with windows according to some embodiments described herein.

FIG. 1 illustrates the MTC device 110A communicating an event detection message to node 105 during a first scheduled window. The node 105 is also communicating with the MTC server 120. FIG. 4 illustrates a timeline with a multiple scheduled windows. It also illustrates the communication from the MTC device 110A to the node 105 occurring during a first window 405. The specific scheduled window for each MTC device may be infrequent. For example, the specific scheduled window may be on the order of every 5, 10, 15, 20, 25, 30, 35, 40, 45, 50, etc. minutes. In some embodiments, the downlink resources used by node 105 to MTC device 110A may not to be in or out of a time window; the time window may only refers to uplink resources.

Figure 2:
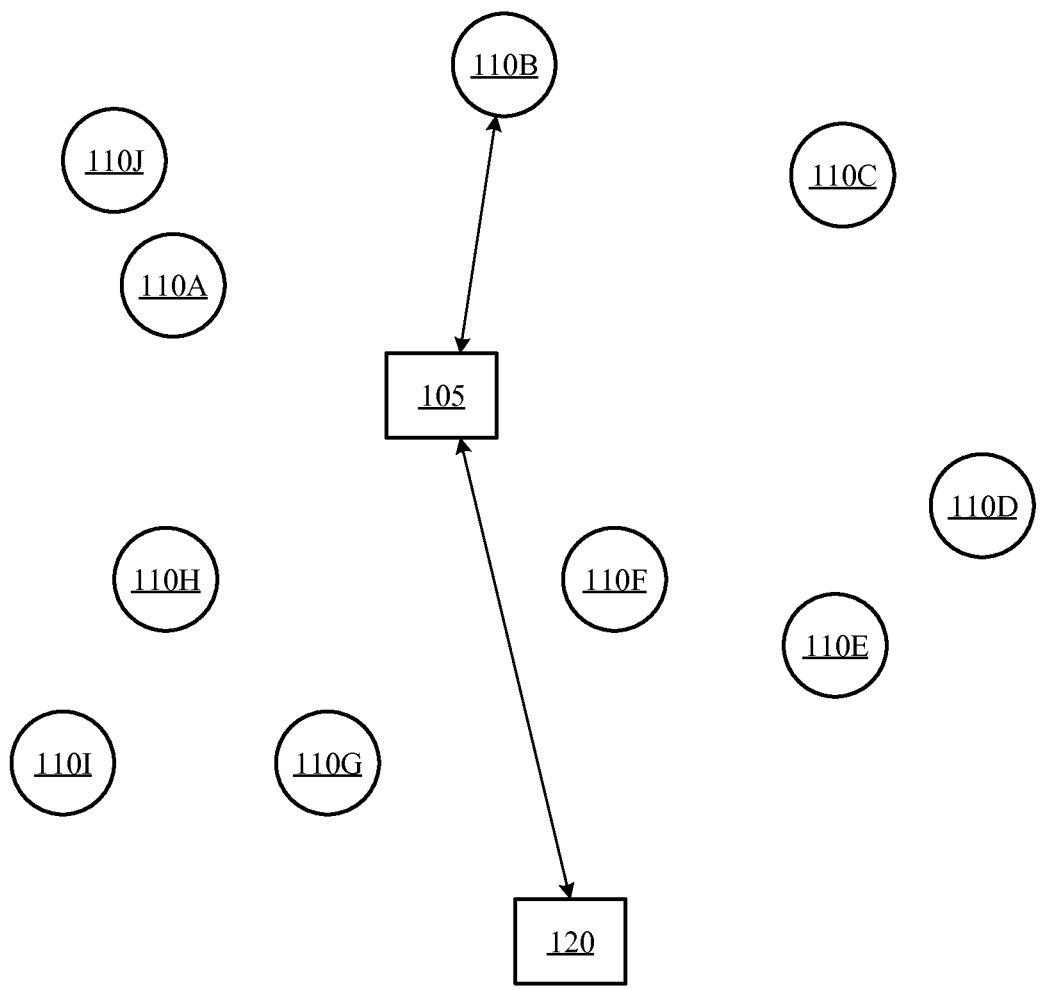
FIG. 2 illustrates the mobile network illustrated in FIG. 1 with a different MTC device in communication with a node.

FIG. 2 illustrates the mobile network illustrated in FIG. 1, but with the MTC device 110B in communication with the node 105. The MTC device 110B may communicate an event detection message to node 105 during a second scheduled window. This is also illustrated in FIG. 4 where the communication from the MTC device 110B to the node 105 is occurring during a second window 410.

Figure 3:
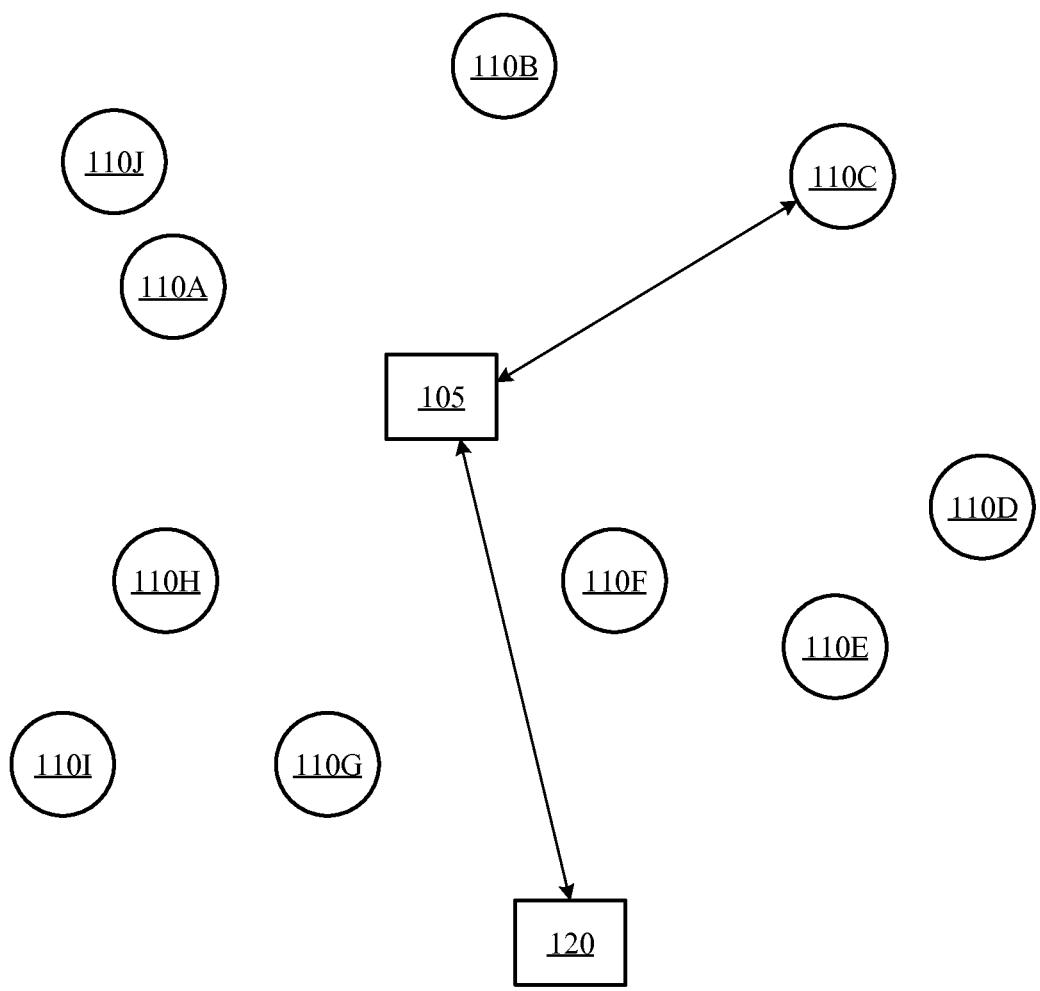
FIG. 3 illustrates the mobile network illustrated in FIG. 1 with another MTC device in communication with a node.

FIG. 3 illustrates the mobile network illustrated in FIG. 1, but with the MTC device 110C in communication of an event detection message to node 105. The MTC device 110C may communicate with the node 105 during a second scheduled window. This is also illustrated in FIG. 4 where the communication from the MTC device 110A to the node 105 is occurring during a third window 415.

Each of the MTC devices 110A-110J may be assigned a scheduled window within which the MTC device communicates with the node 105. During the MTC device's assigned window the MTC device may send an uplink transmission to the node 105.

Each of the MTC devices 110A-110J may only be scheduled for uplink transmission if its uplink transmission timing is synchronized. The random access channel (RACH) may be used as an interface between non-synchronized MTC devices and the orthogonal transmission scheme of the LTE uplink radio access. Random access is generally performed when the MTC device powers on or turns on from sleep mode or during the handoff from one cell to another or when an MTC device loses uplink timing synchronization. At the time of random access, it is assumed that the MTC device is time-synchronized with the node 105 on the downlink.

When an MTC device turns on from sleep mode or is otherwise unsynchronized, the MTC device may first acquire downlink timing synchronization. The downlink timing synchronization may be achieved by receiving primary and secondary synchronization sequences. After acquiring downlink timing synchronization and receiving system information including information on parameters specific to random access, the MTC device may perform a random access preamble transmission. Random access allows the node 105 to estimate and, if needed, adjust the MTC device uplink transmission timing to within a fraction of the guard time (or cyclic prefix).

When the node 105 successfully receives a random access preamble from an MTC device it may send a random access response indicating the successfully received preamble(s) along with the timing advance and uplink resource allocation information to the MTC device. The random access preamble may be sent via a Physical Random Access Channel (PRACH). The MTC device may then determine if its random access attempt has been successful by matching the preamble number it used for random access with the preamble number information received from the node 105. If the preamble number matches, the MTC device assumes that its preamble transmission attempt has been successful and it then uses the timing advance information to adjust its uplink timing. After the MTC device has acquired uplink timing synchronization, it may send uplink scheduling.

A random access preamble may include a complex sequence such as an OFDM symbol, built with a cyclic prefix (part of the end of the sequence is appended at the start of the preamble), thus helping to allow for an efficient frequency-domain receiver at the node 105. The random access preamble length may be shorter than a PRACH slot in order to provide room for some extra time such as guard time to absorb any propagation delay.

If more than one MTC device sends a PRACH preamble during a PRACH slot to the node 105, collisions may occur, which may result in delays in synchronizing the MTC device with the node 105. Delays during synchronization may be tolerated when the scheduled windows are infrequent.

The RACH may also be used by MTC devices to report unscheduled events such as an alarm or an emergency message. For example, the MTC devices 110A-110J may be sensors that monitor gas lines throughout a metropolitan area. Each sensor may perform scheduled communication reporting through scheduled windows as discussed above. These windows, however, may be hours apart, which may be too infrequent in time for a time-sensitive emergency message. The random access channel may be used to quickly communicate emergency message such as, for example, gas leak information. One problem that may arise, however, is that a multiple MTC devices may simultaneously sense the same problem, such as a gas leak, and send an unscheduled emergency message using the RACH, which may result in collision and delays. Such delays may impede a quick response to the emergency being reported.

Figure 5:
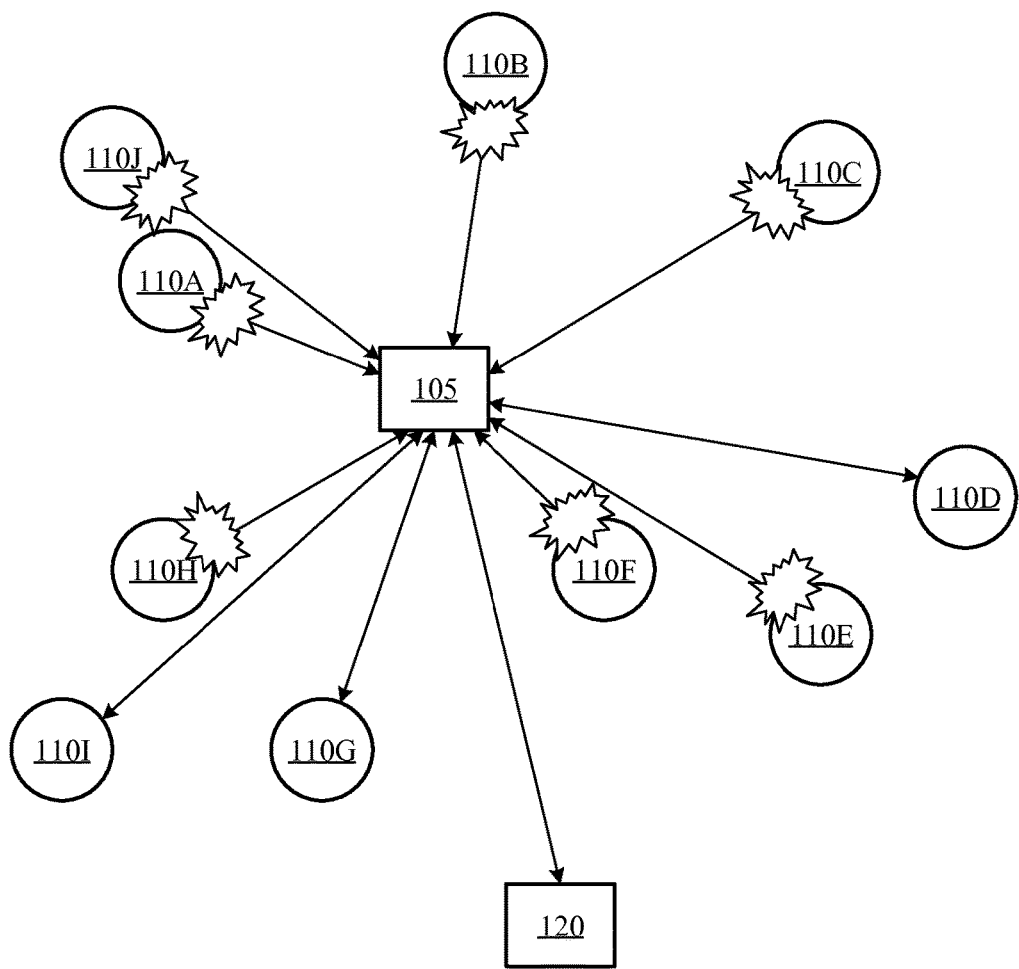
FIG. 5 illustrates an example of an event being sensed by various MTC devices according to some embodiments described herein.

FIG. 5 illustrates an example of an event, such as an accident or an emergency, being sensed by various MTC devices. If these events are sensed at nearly the same time and an event message is sent by each MTC device on the RACH, these event messages may congest the mobile network. In response, the mobile network may reduce the access overload to the node 105 using, for example, an access class barring schemes (or similar schemes) to regulate the opportunity of MTC devices to transmit an access-request message. These access class barring schemes may respond to the event messages from the MTC devices and/or may block the event messages because they are too numerous. In response, MTC devices may back off and wait a period of time (e.g., seconds, minutes or hours) before resending the event message. In some mobile networks, MTC devices are given a lower priority, which may result in even longer delays. Such delays may have catastrophic results depending on the severity of the event.

In some embodiments, an MTC event detection (MTC-ED) class, service, and/or resource may be used that includes some additional restriction on the MTC devices 110 and/or on the node 105. These restrictions may include requiring MTC devices to transmit triggered reports only through the event detection (MTC-ED) class, service, and/or resource (e.g., within predefined scheduled windows). These restrictions may also include dropping MTC devices that try initiating communications on resources other than the event detection class, service, and/or resource.

Figure 6:
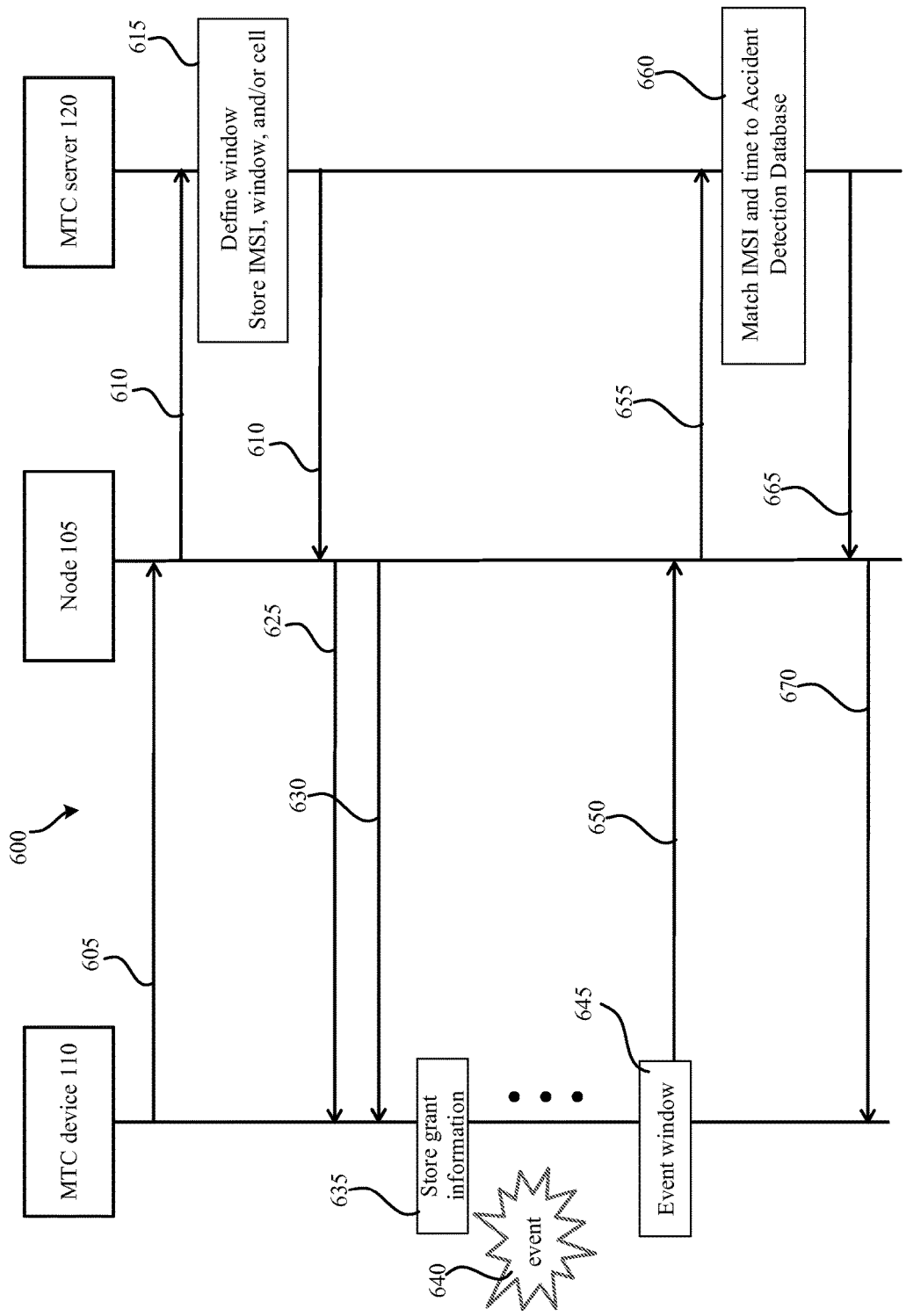
FIG. 6 is an example chart showing communication between an MTC device, a node, and an MTC server according to some embodiments described herein.

FIG. 6 is an example chart 600 showing communication between the MTC device 110, the node 105, and the MTC server 120 of FIGS. 1, 2, 3, and 5, according to some embodiments described herein. At 605, during initialization the MTC device 110 may send an initial uplink sequence. This initial uplink sequence may include, for example, a PRACH or RACH sequence. Moreover, the initial uplink sequence may occur during any time period. The initial uplink sequence may include the MTC device's 110 identifier such as, for example, an international mobile subscriber identity (IMSI).

At 610, the node 105 may forward the MTC device's 110 identifier and request resources to the MTC server 120. In response, at block 615, the MTC server 120 may grant the MTC device 110 a scheduled resource for scheduled reports, which may include, for example, a unique and/or orthogonal preamble sequence, a bandwidth, a frequency channel, a subcarrier assignment, a scheduled window, and/or a modulation scheme, etc. The MTC server 120 may also grant the MTC device 110 a resource for scheduled reports, which may include, for example, a unique and/or orthogonal preamble sequence, a bandwidth, a frequency channel, a subcarrier assignment, an event window, and/or a modulation scheme, etc. A scheduled resource and/or a resource may be created for each MTC device 110 within a given network. The scheduled window information and the event window information may be stored at the MTC server 120 in conjunction with the MTC device's 110 identifier and/or cell or network information.

A window length may equal the total allocated window time divided by the number of MTC devices associated with the node 105. The window start time may equal the window length multiplied by an assigned MTC device number. For example, if there are 1000 MTC devices and the total allocated window time is 12 hours, then each window may have a length of 43.2 seconds. If the MTC device 110C is the $50^{th}$ MTC device out of the 1000 MTC devices, then the window start time is 36 minutes after the first window starts.

The assignment of a scheduled window and/or an event window may change the scheduled window and/or the event window start time and/or length for other MTC devices in the mobile network. Similarly, when an MTC device leaves the mobile network, the scheduled window and/or the event window start time and/or length for other MTC devices in the mobile network, the adjusted window start time and/or window length may be communicated to other MTC devices during scheduled downlink transmissions with the MTC devices. Moreover, each window may overlap into the next scheduled window as guard time to absorb any propagation delay.

At 620, the MTC server 120 may communicate the resource grant including, for example, the scheduled window and/or the event window information to the node 105. At 625, the node 105 may communicate the scheduled report resources to the MTC device 110. And, at 630, the node 105 may communicate the event report resources to the MTC device 110.

At 635, the scheduled resource information and/or the resource information including the scheduled window and/or the event window information may be stored at the MTC device 110. The MTC device 110 may communicate reports to the MTC server 120 through the node 105 using the scheduled resource, for example, during the scheduled window. The content of the scheduled reports may vary depending on the type of MTC device 110.

At 640, an event, such as an event or emergency may occur. The event may be defined for each MTC device based on application. For example, for MTC devices that include or are coupled with a gas sensor, an event may include the sensing of a gas leak. As another example, for MTC devices that include or are coupled with a sensor (e.g., a seismometer, a pressure sensor, a flow sensor, a thermometer, etc.), an event may be a reading (e.g., a seismic reading, a flow reading, or a temperature, etc.) above a threshold value.

In response to the event, the MTC device 110 may wait until the MTC device's event window 645 occurs in order to respond to the event. During the event window, at 650, the MTC device 110 may send an event message to the MTC server 120 through the node 105 that an event has occurred. The event message may include an MTC device identifier such as, for example, the International mobile Subscriber Identity (IMSI) of the MTC device and/or a PRACH sequence that includes a unique preamble may be used as the event message.

Because accident detection can be interpreted as binary information, a single bit may be enough to communicate the occurrence of an event. In some embodiments, no further signaling may be required, no other information may be sent from the node 105 to the MTC device 110, and/or the event message occurs at a time other than the MTC device's scheduled window.

The node 105, at 655, may send the event message to the MTC server 120. In some embodiments, the event message may be a random-access request (e.g., an access-request message) that includes the PRACH sequence and/or the unique preamble received from the node 105 as part of the resources. At 660, the MTC server 120 may determine whether the current time and/or the IMSI identification number of the UE matches the event window time for that UE. If a match occurs, then reporting may occur, such as the triggering on an alarm.

In some embodiments, the event trigger may be correlated among a plurality of MTC devices operating in different cells that are located in the same geographical area. For example, a gas leak may be identified by multiple MTC devices with sensors in the same residential neighborhood, but that are communicating to different nodes 105. A probability of false alarm may be high if a single MTC device is used to report an alarm. But if multiple MTC devices report the event, the probability of false alarm decreases proportionally based on the number of MTC devices sensing the event. Thus, an event may be confirmed when an event message is received from one or more MTC devices in the mobile network. Thus, in some embodiments, reporting may occur if a match occurs in multiple cells receiving an alarm message at the same time.

In response, at 665, the MTC server 120 may send a message to the node 105 that access is not granted for the MTC device. And, at 670, the node 105 may send a RRC connection rejection to the MTC device 110. In some embodiments, no response may be sent by the MTC server 120 and/or by the node 105.

Figure 7:
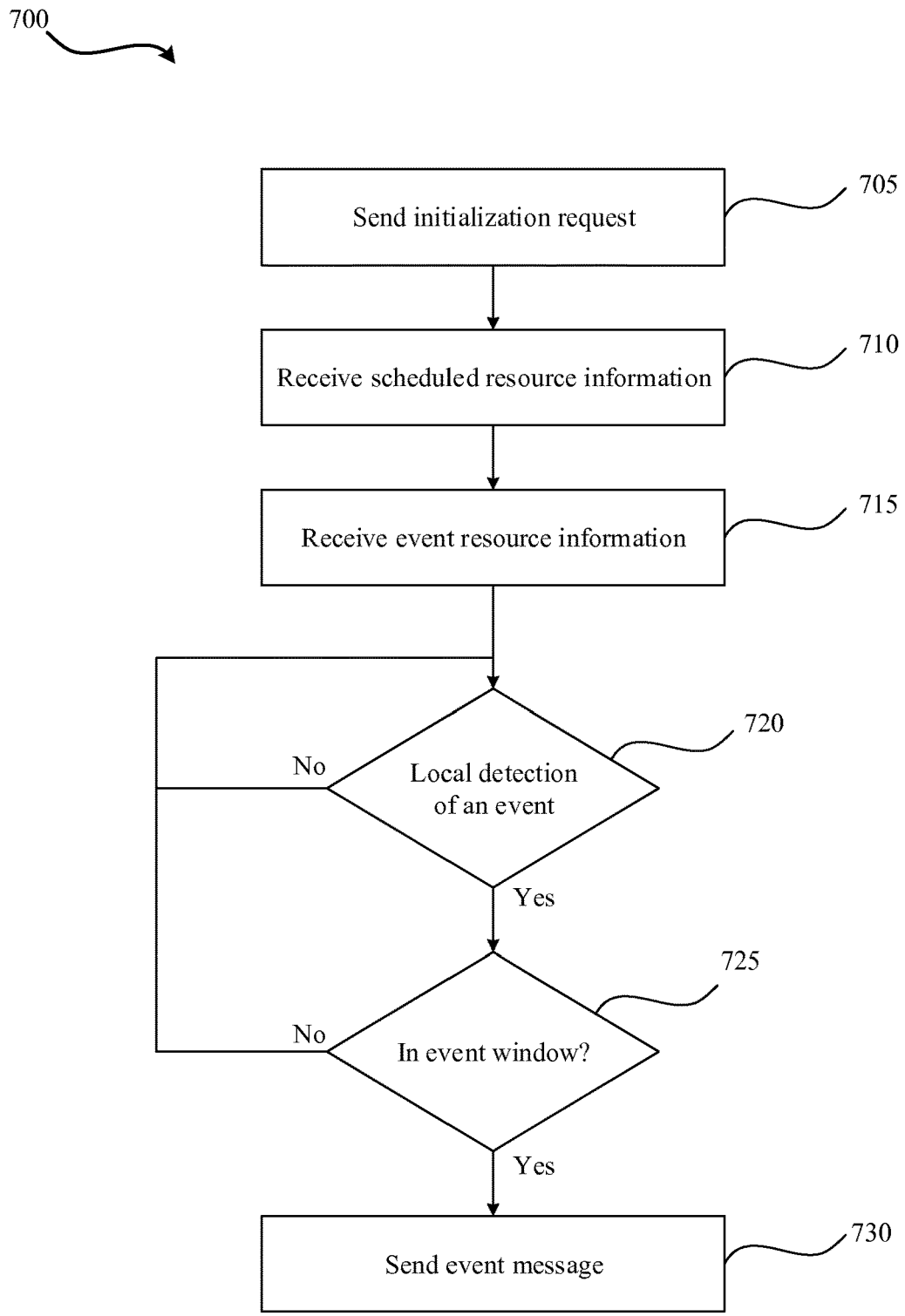
FIG. 7 is an example flowchart of a process for event detection at an MTC device according to some embodiments described herein.

FIG. 7 is an example flowchart of a process 700 for event detection by an MTC device, such as the MTC device 110 of FIGS. 1, 2, 3, and 5, according to some embodiments described herein. The process 700 may begin at block 705. At block 705, the MTC device may send an initialization request to a node and/or to a MTC server associated with the MTC device. The initialization request may include the MTC device's unique identifier (e.g., an IMSI or PRACH sequence).

In return, the MTC device may receive scheduled resource information at block 710 and the MTC device may receive resource information at block 715. In some embodiments, the MTC device may confirm that the scheduled resource information and the resource information is meant for the MTC device by comparing the unique identifier received with the scheduled resource information and/or the resource information. As noted above, the scheduled resource information and/or the resource information may include scheduled window information that is used for sending scheduled reports and/or event window information that is used for sending an event report.

In some embodiments, blocks 705 and 710 may be used when an MTC device first joins a network, cell, or mobile network and/or, for example, when an MTC exits a sleep or hibernate mode.

At block 720 an indication of an event may be received at the MTC device. The event indication may be received, for example, from a sensor that is part of the MTC device or coupled thereto. If an event indication has not been received then the process 700 may return to block 720 until an event indication has been received. During this time, the MTC device may perform other operations. For example, the MTC device may communicate scheduled reports during a scheduled window using scheduled resources.

At block 725, the MTC device may determine whether a current time, such as the time of the occurrence of the event, is within the event window as defined, for example, by the resource. If the current time is not within event window, then the process 700 waits until the event window occurs. Once the event window occurs, the process 700 may proceed to block 730.

At block 730 the MTC device may send an event message during the event window using the resource. The event message may include the MTC device unique identifier (e.g., an IMSI or PRACH sequence). In some embodiments, the event message may be a random access preamble signal that is typically used as a first of multiple signals to establish a connection between the MTC device the node to allow the MTC device to send data to the node. In these and other embodiments, the event message may include only this random access preamble signal and not further signals. For example, the event message may be similar to the initialization request in structure and form. However, because the event message is sent during the event window, the node receiving the event message may interpret the event message as an event message and not an initialization request.

Figure 8:
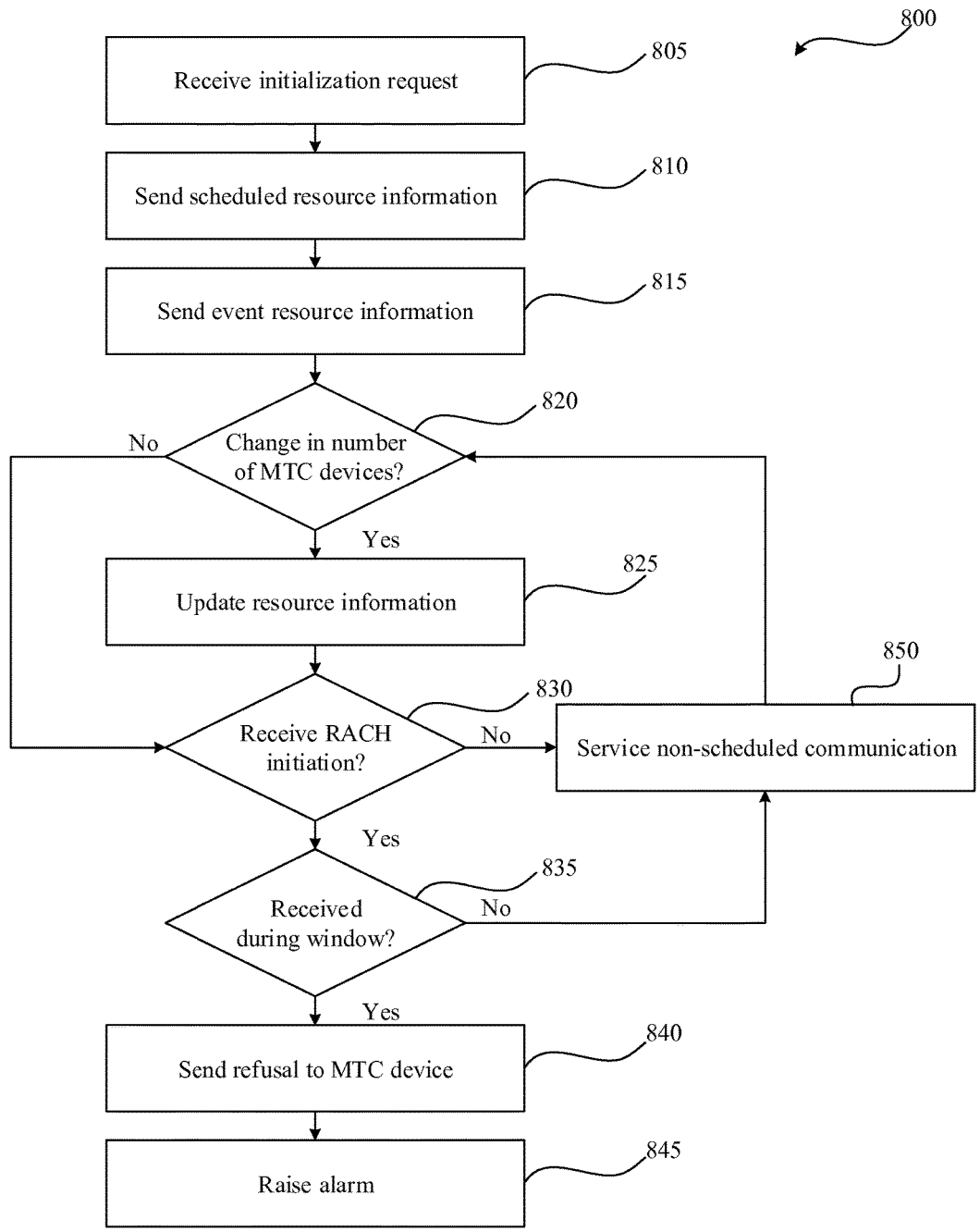
FIG. 8 is an example flowchart of a process for event detection at the MTC server according to some embodiments described herein.

FIG. 8 is an example flowchart of a process 800 for event detection at an MTC server according to some embodiments described herein. The process 800 may begin at block 805. At block 805, the MTC server may receive an initialization request from an MTC device. The initialization request may include the MTC device's unique identifier (e.g., an IMSI or PRACH sequence). In response, the MTC server may establish resources and scheduled resources for the MTC device. The MTC server may also store the event window associated with the resources and the scheduled window associated with the scheduled resources in storage along with the MTC device's unique identifier, for example, in a lookup table.

At block 820, it may be determined if there is a change in the number of MTC devices. If there is not a change in the number of devices then the process 800 proceeds to block 830. Otherwise, the process 800 proceeds to block 825. At block 825, the resource information (e.g., the event window and/or the scheduled window) for other MTC devices may be updated based on the change in the number of MTC devices and/or stored in memory. Some or all of the updated resource information may also be communicated to other MTC devices.

At block 830, it may be determined whether an MTC device has initiated a RACH sequence. If an MTC device RACH sequence has not been initiated, then the process 800 may proceed to block 850. If an MTC device has initiated a RACH sequence, then the process 800 may proceed to block 835.

At block 835, it may be determined whether the current time is within the time event window corresponding to the IMSI of the MTC device initiating the RACH sequence. For example, the MTC server 120 may look up the event window associated with the unique identifier and/or the PRACH sequence and determine whether the event window within which the event message was received matches the stored event window. If the stored event window matches the event window within which the event message was received, the process 800 proceeds to block 840; otherwise, the process 800 services this unscheduled RACH request in block 850 and then returns to block 820.

At block 840, refusal may be sent to the MTC device 110. The refusal, for example, may include an RRC connection reject message. In some embodiments, block 840 may be omitted.

At block 845, a report, such as an alarm, may be issued. A report may be issued, for example, by sending a message to another computer system, outputting a message, etc. In some embodiments, the report may be issued after more than one event message has been received and confirmed at the MTC server.

At block 850, node 105 may service an unscheduled RACH sequence from a MTC device 110 that was not transmitted during the event time window defined for that MTC device 110.

Figure 9:
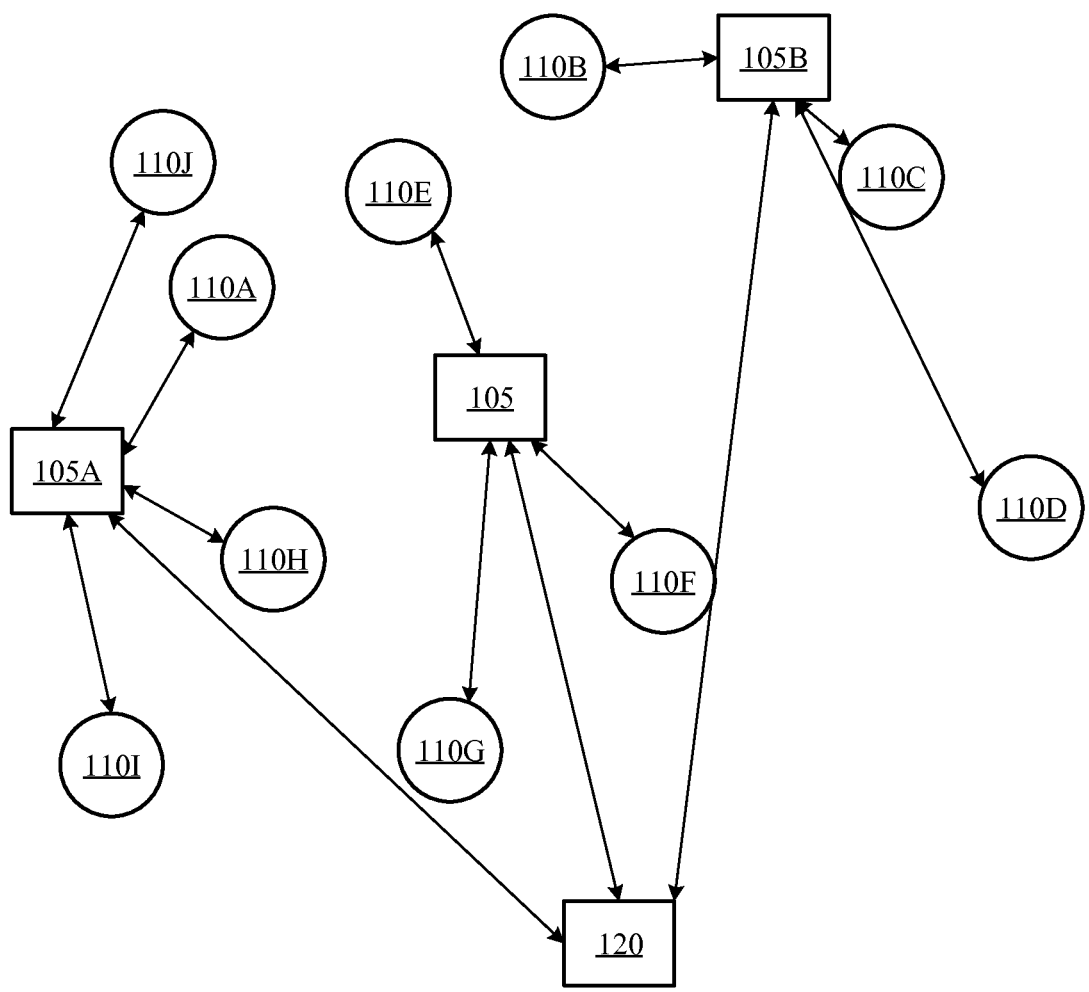
FIG. 9 illustrates multiple nodes used within a network according to some embodiments described herein.

FIG. 9 illustrates multiple nodes 105, 105A, and 105B used within the mobile network of FIGS. 1, 2, 3, and 5, according to some embodiments described herein. The MTC devices 110A, 110H, 110I, and 110J communicate with the node 105A; the MTC devices 110E, 110F, and 110G communicate with the node 105; and the MTC devices 110C, 110B, and 110D communicate with the node 105B. The node 105, the node 105A, and the node 105B each communicate with the MTC server 120. Any number of nodes 105 and/or the MTC devices 110 may be used with the mobile network.

Figure 10:
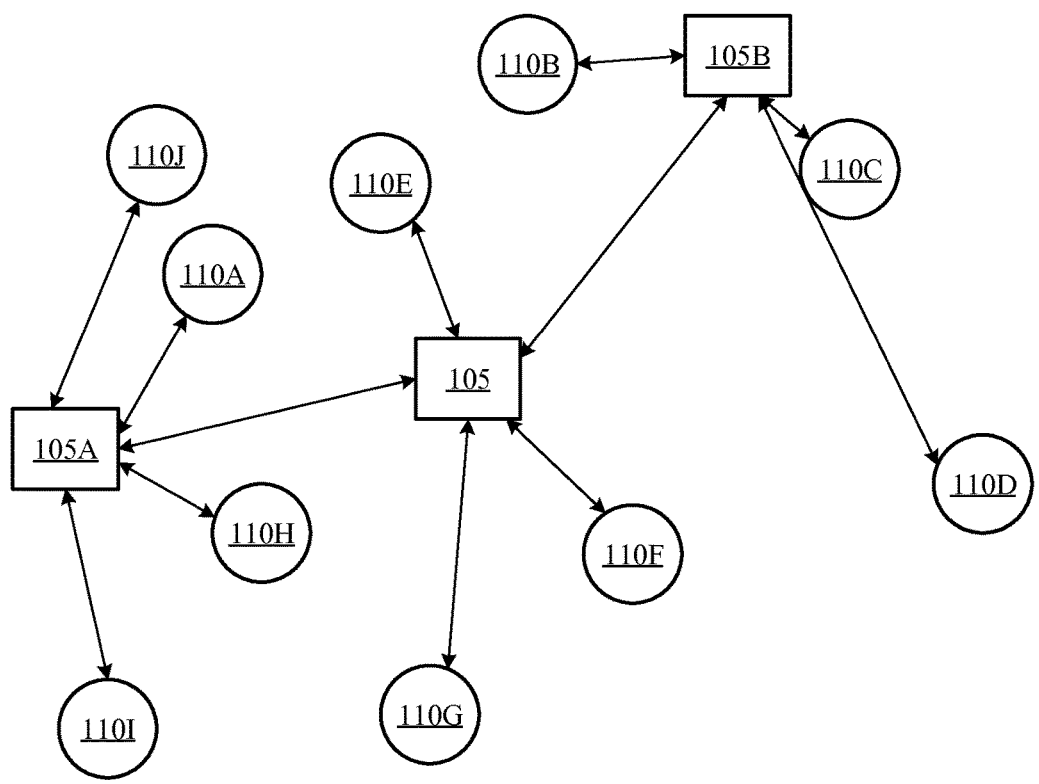
FIG. 10 illustrates multiple nodes used within a network according to some embodiments described herein.

FIG. 10 illustrates multiple nodes 105, 105A, and 105B used within the mobile network of FIGS. 1, 2, 3, and 5, according to some embodiments described herein. The MTC devices 110A, 110H, 110I, and 110J communicate with the node 105A; the MTC devices 110E, 110F, and 110G communicate with the node 105; and the MTC devices 110C, 110B, and 110D communicate with the node 105B. The node 105B and the node 105A communicate with the node 105. The node 105, for example, may perform the functions of the MTC server 120. As another example, the node 105 may be coupled with the MTC server 120 and may forward communication from the node 105A and/or the node 105B to the MTC server 120. Communication between the nodes 105, 105A, and/or 105B may occur using an X2 interface. Any number of nodes 105 and/or the MTC devices 110 may be used.

Figure 11:
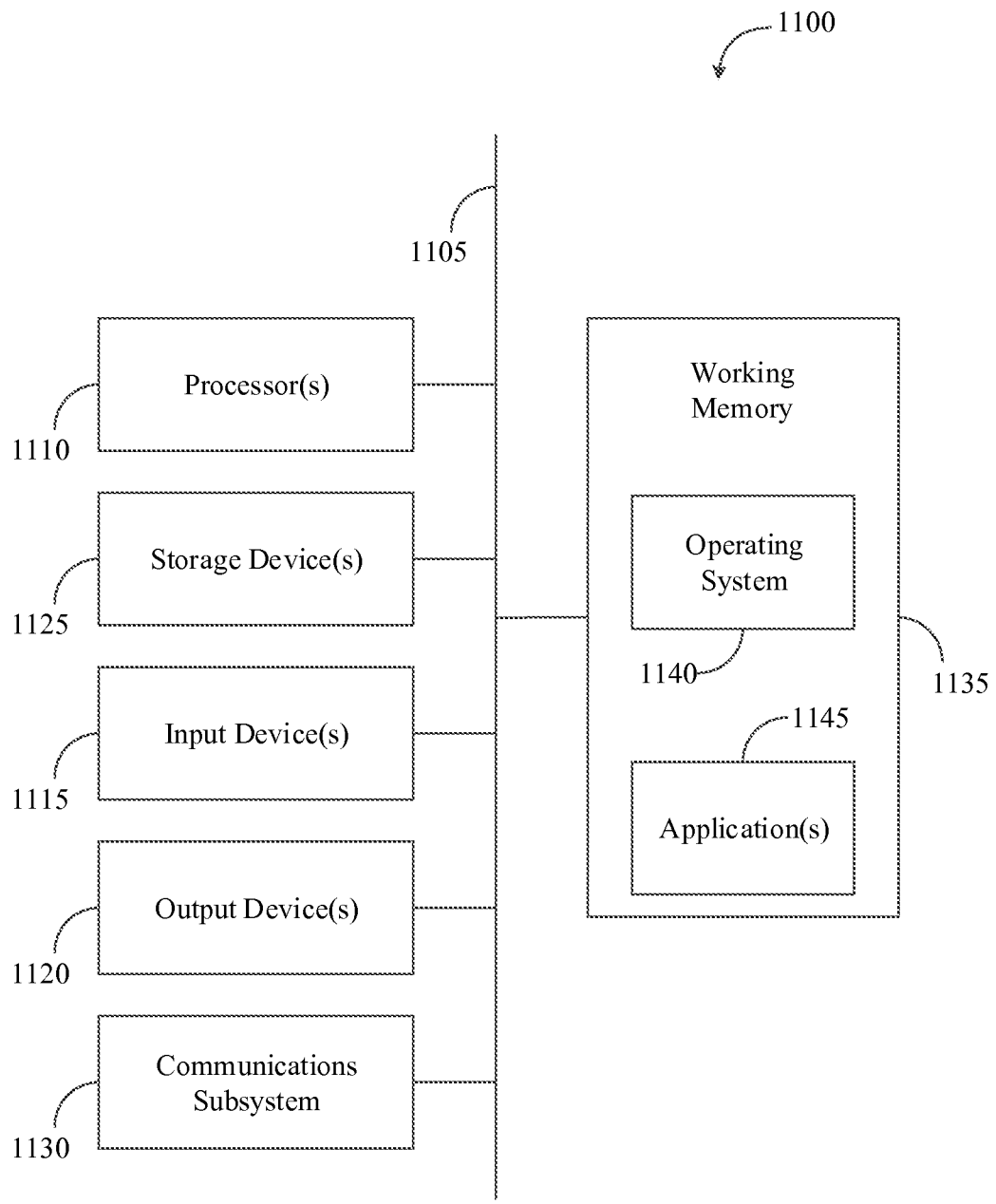
FIG. 11 illustrates an illustrative computational system for performing functionality to facilitate implementation of embodiments described herein.

A computational system 1100 (or processing unit) illustrated in FIG. 11 may be used to perform any of the embodiments described herein. Moreover, the MTC devices 110, the node 105, and/or the MTC server 120 may include the computational system 1100. For example, the computational system 1100 may be used alone or in conjunction with other components to execute all or parts of the processes 600, 700, and/or 800. As another example, the computational system 1100 may be used to perform any calculation, solve any equation, perform any identification, and/or make any determination described herein. The computational system 1100 includes hardware elements that may be electrically coupled via a bus 1105 (or may otherwise be in communication, as appropriate). The hardware elements may include one or more processors 1110, including, without limitation, one or more general-purpose processors and/or one or more special-purpose processors (such as digital signal processing chips, graphics acceleration chips, and/or the like); one or more input devices 1115, which may include, without limitation, a mouse, a keyboard, and/or the like; and one or more output devices 1120, which may include, without limitation, a display device, a printer, and/or the like.

The computational system 1100 may further include (and/or be in communication with) one or more storage devices 1125, which may include, without limitation, local and/or network-accessible storage and/or may include, without limitation, a disk drive, a drive array, an optical storage device, and/or a solid-state storage device, such as random access memory ("RAM") and/or read-only memory ("ROM"), which may be programmable, flash-updateable, and/or the like. The computational system 1100 might also include a communications subsystem 1130, which may include, without limitation, a modem, a network card (wireless or wired), an infrared communication device, a wireless communication device, and/or chipset (such as a Bluetooth® device, an 1102.6 device, a Wi-Fi® device, a WiMAX device, cellular communication facilities, etc.), and/or the like. The communications subsystem 1130 may permit data to be exchanged with a network (such as the network described below, to name one example) and/or any other devices described herein. In many embodiments, the computational system 1100 will further include a working memory 1135, which may include a RAM or ROM device, as described above. The memory 125 shown in FIG. 1 may include all or portions of the working memory 1135 and/or the storage device(s) 1125.

The computational system 1100 also may include software elements, shown as being currently located within the working memory 1135, including an operating system 1140 and/or other code, such as one or more application programs 1145, which may include computer programs of the invention and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1125 described above.

In some cases, the storage medium might be incorporated within the computational system 1100 or in communication with the computational system 1100. In other embodiments, the storage medium might be separate from the computational system 1100 (e.g., a removable medium, such as a compact disk, etc.), and/or provided in an installation package, such that the storage medium may be used to program a general-purpose computer with the instructions/code stored thereon. These instructions might take the form of executable code, which is executable by the computational system 1100 and/or might take the form of source and/or installable code, which, upon compilation and/or installation on the computational system 1100 (e.g., using any of a variety of generally available compilers, installation programs, compression/decompression utilities, etc.), then takes the form of executable code.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method for event detection at a node, the method comprising:
   receiving an initial uplink sequence from an MTC device in which the initial uplink sequence includes an MTC identifier associated with the MTC device and includes a request for communication resources;
   in response to the request for communication resources, allocating a scheduled communication window for scheduled reports by the MTC device;
   in response to the request for communication resources, allocating an event communication window for reporting unscheduled events by the MTC device;
   sending information regarding the scheduled communication window and the event communication window to the MTC device;
   receiving an event message from the MTC device via a resource on a communication network during a specific event window, wherein the event message includes an MTC device identifier associated with the MTC device and is associated with an unscheduled event;
   determining whether the MTC device identifier is associated with the specific event window based the information regarding the determined event communication window; and
   in the event the MTC device identifier is associated with the specific event window, outputting an event report related to the unscheduled event; or
   in the event the MTC device identifier is not associated with the specific event window, not outputting the event report.

2. The method according to claim 1, wherein the message comprises at least a portion of a first uplink transmission of a RACH sequence.

3. The method according to claim 1, further comprising sending a connection rejection message to the MTC device in the event the MTC device identifier is not associated with the specific event window.

4. The method according to claim 1, wherein the message is received from the MTC device via a node.

5. The method according to claim 1, wherein the communication network is an LTE network.

6. The method according to claim 1, further comprising:
   receiving a plurality of messages from a plurality of MTC devices via a plurality of resource nodes located in the same geographical area at the same time, wherein each message includes an MTC device identifier corresponding with a specific MTC device;
   determining whether each of the plurality of MTC device identifiers is associated with one of a plurality of specific event windows for each of nodes receiving messages; and
   in the event the number of MTC device identifiers are associated with one of the plurality of specific event windows is greater than a threshold value, outputting an event report.

7. A wireless network system for event detection, the wireless network system comprises:
   a plurality of MTC devices;
   at least one node in communication with the plurality of MTC devices via a wireless network; and
   at least one MTC server in communication with the node, wherein the MTC server is configured to:
   receive an initial uplink sequence from each of the plurality of MTC devices in which the initial uplink sequence includes a corresponding MTC identifier associated with the respective MTC device and includes a request for communication resources;
   in response to each request for communication resources, allocate a scheduled communication window for each respective MTC device of the plurality of MTC devices for scheduled reports by the respective MTC device;
   in response to the request for communication resources, allocate an event communication window for each respective MTC device of the plurality of MTC devices for reporting unscheduled events by the respective MTC device;

send corresponding information regarding the scheduled communication window and the event communication window to each respective MTC device of the plurality of MTC devices;

receive a plurality of event messages from the plurality of MTC devices, wherein each of the plurality of event messages is received during a corresponding one of a plurality of event windows, and wherein each event message includes an MTC device identifier that corresponds with one MTC device of the plurality of MTC devices and is associated with an unscheduled event;

determine whether each of the plurality of event messages were received during an event window assigned to one of the plurality of MTC devices based the information regarding the determined event communication window for each of the plurality of MTC devices; and output an event report based on the plurality of event messages.

8. The wireless network system according to claim 7, wherein the MTC server is further configured to:

count the number of event messages that were received during one of the plurality of event windows assigned to the MTC device that sends the event message;

determine whether the number of event messages is greater than a threshold value; and output the event report in response to determining that the number of event messages is greater than the threshold value.

9. The wireless network system according to claim 7, wherein each of the plurality of event messages is received during a different event window.

10. The wireless network system according to claim 7, wherein each of the plurality of event messages comprises at least a portion of a first uplink transmission of a RACH sequence.

11. The wireless network system according to claim 7, wherein the communication network is an LTE network.

12. A non-transitory computer-readable medium having encoded therein programming code executable by a processor to perform operations comprising:

receiving an initial uplink sequence from an MTC device in which the initial uplink sequence includes an MTC identifier associated with the MTC device and includes a request for communication resources;

in response to the request for communication resources, allocating a scheduled communication window for scheduled reports by the MTC device;

in response to the request for communication resources, allocating an event communication window for reporting unscheduled events by the MTC device;

sending information regarding the scheduled communication window and the event communication window to the MTC device;

receiving an event message from the MTC device via a resource on a communication network during a specific event window, wherein the event message includes an MTC device identifier associated with the MTC device and is associated with an unscheduled event;

determining whether the MTC device identifier is associated with the specific event window based the information regarding the determined event communication window; and in the event the MTC device identifier is associated with the specific event window, outputting an event report.

13. The computer-readable media according to claim 12, wherein the event message comprises a PRACH sequence.

14. The computer-readable media according to claim 12, wherein the programming code executable by a processor is further configured to perform operations comprising sending a connection rejection message to the MTC device.

15. The computer-readable media according to claim 12, wherein the event message is received from the MTC device via a node.

16. The computer-readable media according to claim 12, wherein the communication network is an LTE network.

17. The computer-readable media according to claim 12, wherein the programming code executable by a processor is further configured to perform operations comprising:

receiving a plurality of event messages from a plurality of MTC devices via a plurality of resources on the communication network during a plurality of specific event windows, wherein each event message includes an MTC device identifier corresponding with a specific MTC device;

determining whether each of the plurality of MTC device identifiers is associated with one of the plurality of specific event windows; and in the event the number of MTC device identifiers are associated with one of the plurality of specific event windows is greater than a threshold value, outputting an event report.

* * * * *